Aug. 8, 1933.　　　　P PORTE　　　1,921,980
WRENCH
Filed Oct. 10, 1932
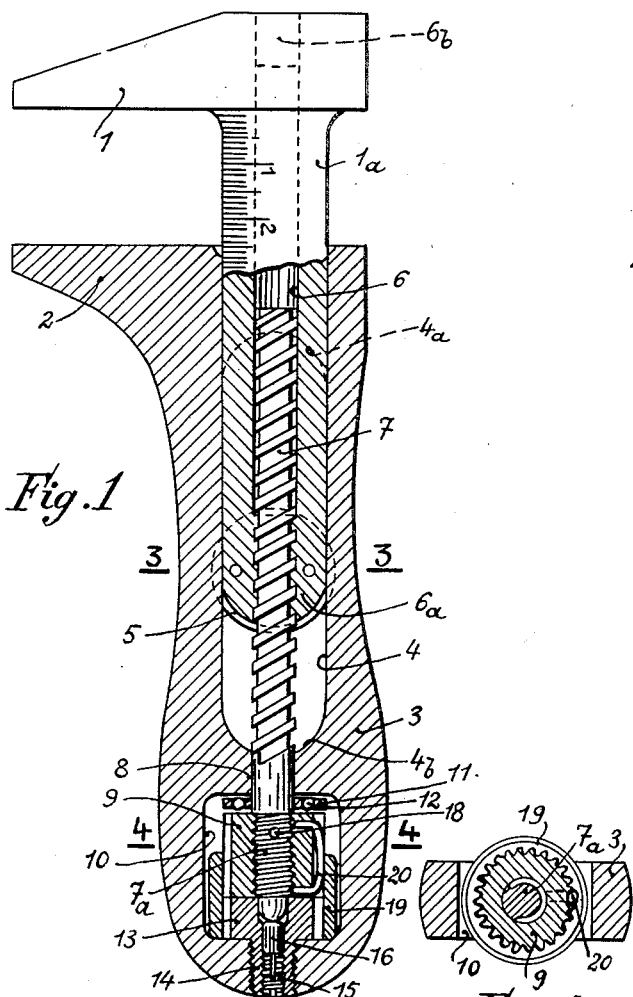
Inventor
Pierre Porte,
By William C. Linton.
Attorney.

Patented Aug. 8, 1933

1,921,980

UNITED STATES PATENT OFFICE 1,921,980

WRENCH

Pierre Porte, Viroflay, France

Application October 10, 1932, Serial No. 637,146, and in France October 10, 1931

4 Claims. (Cl. 81—155)

The present invention has for object improvements in wrenches, with rapid tightening and which do not become dis-adjusted.

The wrench constructed according to the invention comprises a helicoidal spindle, with reversible action, provided with one or several quick screw threads and the free end of which is housed in the tail of the movable jaw.

One of the characteristic features of the invention resides in that two plates secured to the tail of the movable jaw serve as guides for the said tail which they hold in a cage formed in the sleeve or handle prolonging the fixed or stationary jaw and that they form external knobs facilitating the movement of the movable jaw.

The chief improvement aimed at in the invention resides in the simplicity of the locking arrangement for the helicoidal spindle for the purpose of preventing any rotation thereof. This arrangement comprises a loose roller integral with the spindle and a roller secured to the handle of the wrench; these two rollers are channeled longitudinally and have grooves of the same width. A locking sleeve, channeled internally with grooves identical to those of the rollers, can slide on the latter and when desired, render them integral or free them in order to prevent or permit the rotation of the helicoidal spindle carried or supported in the handle of the wrench.

Finally the invention provides for a brake device for the locking sleeve so as to prevent any unintentional movement thereof, and consisting of a spring in the form of an arcuate wire bearing in one of the channels of the loose roller and exerting a pressure on one of the internal grooves of the locking sleeve.

The invention will moreover be better understood from the following description reference being had to the accompanying drawing which shows:

Fig. 1 an elevation of the wrench partly in section;

Fig. 2 a side view of the wrench;

Fig. 3 a section taken on the line 3—3 of Fig. 1;

Fig. 4 a section taken on the line 4—4 of Fig. 1.

The wrench comprises a movable jaw 1 prolonged by a tail rod $1_a$ which engages in the stationary jaw 2 carried by the sleeve or handle 3. This tail piece can be graduated over part of its length.

The sleeve or handle 3 has a large recess 4 in which the tail $1_a$ can slide. Two small plates 5 secured at a suitable point to the tail piece or rod $1_a$ and slidably overlapping the adjacent portions of the handle 3 serve for the guiding of the tail piece $1_a$ and also to limit its travel in both directions by abutting against the ends $4_a$ and $4_b$ of the recess or opening 4.

The said plates have ribbed cups $5_a$ (Fig. 3) facilitating their manipulation with the fingers. The plates are secured to the tail piece $1_a$ by two screws $5_b$ which pass through the latter.

The tail piece or rod $1_a$ has a channel 6, the end $6_a$ of which is alone formed with a screw thread cooperating with the threaded spindle 7. The smooth portion of the channel 6, therefore, leaves the inner portion of the spindle 7 free to slide therein. A plug $6_b$ closes the other end of the channel 6.

The end of the spindle 7 passes through a bearing 8 formed in the handle 3 (Fig. 1). Said extremity may be smooth over its entire length or have a smooth part and a screw threaded part $7_a$. The smooth part corresponds, in this case, to the bearing 8 and the screw threaded part $7_a$ screws in a roller 9 housed in a recess 10 formed in the handle 3 beyond the recess 4, but separated therefrom by the bearing 8. Between the roller 9 and the said bearing is disposed a washer 11 pierced with several holes in which are housed balls 12 adapted to facilitate the running of the roller against the bearing 8.

The end of the screw $7_a$ is like-wise smooth and engages in a second roller 13 forming a supporting stud. This roller is provided with a screw threaded dowel pin 14 screwed into the extremity of the handle 3. In this dowel pin is screwed a screw 15 resting on a small channeled stud 16 resting on the rounded extremity of the screw $7_a$. The holes pierced in the dowel pin 14 is likewise channeled in such a manner as to prevent the stud 16 from turning. The screw 15 is split in such a manner as to serve as a brake on any unintentional loosening or untightening.

This arrangement permits by screwing the screw 15 to take up the play which may occur in the wrench.

A pin or screw can be housed between the male and female parts of the screw thread 14 or rest thereon to prevent any rotation of the fixed roller 13. Likewise, a pin 18 can pass through the roller 9 of the spindle 7 in such a manner that the latter is made rigid with the said roller.

This free roller 9 and the fixed roller 13 are channeled longitudinally and have equidistant grooves which can be brought in alignment with each other.

A locking sleeve 19 preferably having a milled outer surface is disposed to slide on the two rollers 9 and 13 and has internal channels corresponding to those of the two rollers.

The height of the locking sleeve 19 is practically equal to that of the roller 9 which is twice as high as the roller 13, so that the said locking sleeve can be placed completely on the roller 9 without touching the fixed roller 13, which leaves free the roller 9 and the screw 7, or can overlap or ride on the two roller and thus ensure their connection and thereby the locking of the roller 9 and the screw 7. The latter can no longer, in this case, turn and the wrench is locked.

To prevent a too easy slipping of the locking sleeve 19 on the rollers, the braking of the locking sleeve is ensured by a spring of arcuate shape consisting of a steel wire 20 the two extremities of which are bent over and engaged in the free roller 9, the main straight portion of said wire is nested within one channel of the roller. The spring engages in one of the grooves of the locking sleeve 19 when the latter is manipulated and prevents, by its pressure on the said groove all unintentional movement of the locking sleeve.

The operation of the wrench is readily understood. If the locking sleeve 19 is placed on the free roller 9, the endless screw 7, the roller 9 and the locking sleeve 19 can turn freely. Any displacement of the jaw 1 is translated by an effort of the screw threaded part 6a of the tail 1a on the endless screw 7 causing a rotation thereof. This displacement can therefore be rapid, the great reversibility of the screw preventing any resistance thereof.

If, on the contrary, the curser 19 is brought over the fixed roller 13 as shown in Figure 1, the two rollers 9 and 13 are rigidly interconnected and any rotation of the loose roller 9 is impossible because it is held by the stationary roller 13 fixed with the handle 4. Any rotation of the screw 7 is likewise impossible and in consequence, any displacement of the jaw 1 is prevented.

The operation of the wrench can therefore be effected by acting either on the jaw 1, or on the jaw 2, or on the plates 5 or again on the locking sleeve 19 which actuates the screw 7 by rotation.

It is obvious that modifications in shape and detail may be embodied to the wrench herein described without exceeding the scope of the invention.

What I claim, is:

1. A wrench of the character described comprising a fixed jaw provided with a handle, a movable jaw having a rod extending therefrom and adapted to slide in said fixed jaw and its handle, a spindle in screw threaded engagement with said rod, a roller secured to the spindle, a ring rigid with the fixed jaw handle and disposed in longitudinal alinement with the roller, said roller and ring having corresponding channels formed upon their outer peripheral surfaces, and a locking sleeve internally channeled and slidably displaceable over said ring and roller whereby to interconnect the same and thus prevent rotation of the spindle.

2. A wrench of the character described comprising a fixed jaw provided with a handle, a movable jaw having a rod extending therefrom and adapted to slide in said fixed jaw and its handle, a spindle in screw threaded engagement with said rod, a roller secured to the spindle, a ring rigid with the fixed jaw handle and disposed in longitudinal alinement with the roller, said roller and ring having corresponding channels formed upon their outer peripheral surfaces, a locking sleeve internally channeled and slidably displaceable over said ring and roller whereby to interconnect the same and thus prevent rotation of said spindle, and an arcuate spring secured to said roller in one channel thereof and engageable with a corresponding channel in said sleeve whereby to withhold the latter against accidental displacement.

3. A wrench of the character described comprising a fixed jaw provided with a handle, a movable jaw having a rod extending therefrom and adapted to slide in said fixed jaw and its handle, a spindle in screw threaded engagement with said rod, a roller secured to the spindle, a ring rigid with the fixed jaw handle and disposed in longitudinal alinement with the roller, said roller and ring having corresponding channels formed upon their outer peripheral surfaces, a locking sleeve internally channeled and slidably displaceable over said ring and roller whereby to interconnect the same and thus prevent rotation of the spindle, a stud received in said ring and supporting the extremity of said spindle, and means for adjusting said stud.

4. A wrench of the character described comprising a fixed jaw provided with a handle, a movable jaw having a rod extending therefrom and adapted to slide in said fixed jaw and its handle, said rod having an internal channel formed therein, a bearing in the channel of said fixed jaw, a chamber below said bearing, a spindle supported in said bearing with one end extending into the chamber and the other end in screw threaded engagement with the end portion of the rod extending from the movable jaw, a roller housed in said chamber and secured to the extended end of the spindle, a ring also housed in said chamber and disposed in longitudinal alinement with said roller, said roller and ring having corresponding channels formed upon their outer peripheral surfaces, and a locking sleeve internally channeled and slidably displaceable over said ring and roller whereby to interconnect the same and thus prevent rotation of said spindle.

PIERRE PORTE.